United States Patent
Kubota et al.

(10) Patent No.: US 7,280,448 B2
(45) Date of Patent: Oct. 9, 2007

(54) POSITIONING CONTROL DEVICE AND POSITIONING CONTROL METHOD

(75) Inventors: Masashi Kubota, Tokyo (JP); Sigeru Shimonou, Tokyo (JP); Naotoshi Iwasawa, Tokyo (JP)

(73) Assignee: Nec Corporation, Tokyo (JP)

( * ) Notice: Subject to any disclaimer, the term of this patent is extended or adjusted under 35 U.S.C. 154(b) by 405 days.

(21) Appl. No.: 10/470,727

(22) PCT Filed: Feb. 5, 2002

(86) PCT No.: PCT/JP02/00923

§ 371 (c)(1),
(2), (4) Date: Jul. 31, 2003

(87) PCT Pub. No.: WO02/063623

PCT Pub. Date: Aug. 15, 2002

(65) Prior Publication Data

US 2004/0240339 A1    Dec. 2, 2004

(30) Foreign Application Priority Data

Feb. 7, 2001  (JP)  ............................. 2001-030525

(51) Int. Cl.
*G11B 7/00* (2006.01)
(52) U.S. Cl. .................. 369/44.34; 369/44.29
(58) Field of Classification Search ...................... None
See application file for complete search history.

(56) References Cited

U.S. PATENT DOCUMENTS 5,859,743 A * 1/1999 Kisaka .................... 360/78.04

7,136,339 B2 * 11/2006 Kubota et al. ........... 369/53.29

FOREIGN PATENT DOCUMENTS

| JP | 59-223977 A | 12/1984 |
|---|---|---|
| JP | 60-57085 B2 | 12/1985 |
| JP | 63-10384 A | 1/1988 |
| JP | 9-50303 | 2/1997 |
| JP | 2001-126421 A | 5/2001 |

OTHER PUBLICATIONS

Japanese Application Publication No. 2001-126421 machine translation, Oonuki Yoshikazu, Disk drive device and head positioning controlling method for the device, May 11, 2001.*

* cited by examiner

*Primary Examiner*—William Korzuch
*Assistant Examiner*—Joseph Haley
(74) *Attorney, Agent, or Firm*—Sughrue Mion, PLLC

(57) ABSTRACT

A positioning control device and method in which the relative position error in tracking is reduced by using the periodicity of position shift. The positioning control device comprises a position detecting unit for measuring the relative position error between the desired position of an objective member and a moving member, an adding unit for adding a position error signal output from the position detecting unit and a delay signal, a signal delay unit for outputting the delay signal which is obtained by delaying an output of the adding unit at a period corresponding to the position shift of the objective member, a drive unit for moving a moving member, and an inputting unit for inputting the signal of the sum of the position error signal and the delay signal to the drive unit and addition-inputting the delay signal to the drive unit through a filter having a predetermined frequency characteristic in a specific frequency range.

10 Claims, 8 Drawing Sheets

POSITIONING CONTROL DEVICE AND POSITIONING CONTROL METHOD

TECHNICAL FIELD

The present invention relates to a positioning control technique for keeping a member following a target position, and more particularly, to a positioning control device and a positioning control method for keeping a transducer such as a spot of light and a magnetic head used to record signals and/or reproduce recorded signals following a track on a disk storage, as in a track-following servo system used in a magnetic disk unit, a focusing (focus servo) system or a tracking system used in an optical disk unit.

BACKGROUND ART

In order to increase the information storage density or track density, an optical disk unit that records/reproduces information by emitting a light beam at a disk storage is required to ensure accurate track-following of the beam to target disk-tracks or accurate focusing (focus control) in response to disk surface runout.

Generally, the accuracy of tracking control is improved by increasing the loop gain of a control system to provide the control loop with a higher response frequency band. However, there is a limit to characteristics of a drive mechanical system for driving a moving member, and it is often the case that enough accuracy cannot be secured.

One conceivable approach to resolve this problem involves the use of regularity in runout on the surface or recording track of a disk storage to reduce the error. That is, the rotation of a disk causes positional shifts or up-and-down movements on a disk surface, and the main elements of the shifts are substantially synchronized with the rotation of a disk. Consequently, by taking advantage of the periodicity of shifts in information recorded/recording position (objective member) on a disk, the tracking performance of the moving member (a light beam spot) for the objective member can be improved with the use of a position error signal generated by the last or more previous rotation.

There is found an example of such technique in Japanese Patent publication No. SHO60-57085 (first prior art). The positioning control device of the first prior art is provided with a signal delay unit for integrating/accumulating position error signals in synchronism with a rotation period for position shifts or fluctuations having constant periodicity. The position error signal of each moment is added/input in the signal delay unit, and the sum of the output of the signal delay unit and the position error signal is input in a drive unit for a moving member.

According to the first prior art, when the periodic position shift occurs n times, a relative position error Xe is given by:

$$Xe = Xi / \{1 + G(s)\}^n$$

in which G(s) is a transfer function of the drive unit, and Xi is the periodic position shift of an objective member. This indicates that the output of the delay unit approaches $Xi/G(s)$.

Namely, in a frequency domain where the absolute value of $1+G(s)$ is bigger than 1, the relative position error approaches 0, and a signal for making the moving member react to the periodic position shift is almost given by the output of the signal delay unit. Consequently, the tracking performance can be vastly improved without too much increase in the gain (the absolute value of G(s)) of a drive system or response frequency band (frequencies where the gain of G(s) is 1).

PROBLEMS THAT THE INVENTION IS TO SOLVE

According to the first prior art, however, there is a problem in that the error is reduced only in the frequency domain where the absolute value of $1+G(s)$ is sufficiently bigger than 1 and, on the contrary, in the case where $1+G(s)$ is smaller than 1, the error expands (diverges) rather than contracts.

For example, when the drive unit has a second order phase-delay characteristic, if the phase is delayed by nearly 180 degrees at the frequency where the gain (absolute value) of G(s) is close to 1, $1+G(s)$ shows a value considerably smaller than 1.

In an ordinary control system, $1/(1+G(s))$ represents how much existent displacement or offset can be reduced to a little position error by control, namely, error reduction ratio, and the value of $1+G(s)$ smaller than 1 is observed as a phenomenon in which the position error becomes bigger than its original value in the vicinity of the cut-off frequency (frequency where the gain of G(s) is 1=0 db) of the control loop.

With this construction of the first prior art, the error signal gets bigger and bigger or diverges in a frequency band where $1+G(s)$ is smaller than 1.

Accordingly, the application of the first prior art demands some kind of measures to avoid that prospect. One approach involves the use of a low-pass filter that attenuates signals input to the signal delay unit in the vicinity of the cut-off frequency of the control loop before inputting the sum of the output of the signal delay unit and the position error signal into the signal delay unit. In other words, according to the first prior art, the displacement of an information recorded/recording position (objective member) on a disk, which synchronizes with the rotation of the disk, can be reduced only in a frequency range which satisfies the condition that the gain of the drive unit is adequate and the value of $1+G(s)$ is sufficiently bigger than 1, and in a frequency range where $1+G(s)$ approximates to 1 or is smaller than 1 (a range of frequencies higher than the vicinity of the cut-off frequency of the control loop), no error reducing effect can be expected.

It is therefore an object of the present invention to provide a positioning control device and a positioning control method for reducing the relative position error in tracking by using the periodicity of position shift or fluctuation without unnecessarily increasing the gain and frequency band being the transfer characteristics of the control system.

DISCLOSURE OF THE INVENTION

In accordance with the first aspect of the present invention, there is provided a positioning control device for positioning a moving member so that the moving member follows an objective member which periodically marks about the same position shift, comprising: a position detecting unit for measuring the relative position error between the desired position of the objective member and the moving member; an adding unit for adding a position error signal output from the position detecting unit and a delay signal; a signal delay unit for outputting the delay signal which is obtained by delaying an output of the adding unit at a period corresponding to the position shift of the objective member; a drive unit for moving the moving member; and an inputting unit for inputting the signal of the sum of the position error signal and the delay signal to the drive unit, and addition-inputting the delay signal to the drive unit through a filter having a predetermined frequency characteristic in a specific frequency range.

In accordance with the second aspect of the present invention, in the first aspect, the specific frequency range includes frequencies where the gain, the transfer characteristic of the drive unit, approximates to 1.

In accordance with the third aspect of the present invention, in the first aspect, the predetermined frequency characteristic is about equal to the inverse characteristic (1/G) of the transfer characteristic (G) of the drive Unit.

In accordance with the fourth aspect of the present invention, there is provided a positioning control device for positioning a moving member so that the moving member follows an objective member which periodically marks about the same position shift, comprising: a position detecting unit for measuring the relative position error between the desired position of the objective member and the moving member; an adding unit for adding a position error signal output from the position detecting unit and a delay signal; a signal delay unit for outputting the delay signal which is obtained by delaying an output of the adding unit at a period corresponding to the position shift of the objective member; a drive unit for moving the moving member in the desired direction; an inputting unit for inputting the signal of the sum of the position error signal and the delay signal to the drive unit; and an energizing unit for energizing the drive unit and/or the moving member so that the moving member makes a movement approximately equivalent to the amount of the position shift indicated by the delay signal in a specific frequency range.

In accordance with the fifth aspect of the present invention, there is provided a positioning control method for positioning a moving member so that the moving member follows an objective member which periodically marks about the same position shift, comprising: a position detecting step for measuring the relative position error between the desired position of the objective member and the moving member; an adding step for adding a position error signal output from the position detecting step and a delay signal; a signal delaying step for outputting the delay signal which is obtained by delaying an output of the adding step at a period corresponding to the position shift of the objective member; a driving step for moving the moving member; and an inputting step for inputting the signal of the sum of the position error signal and the delay signal to the driving step, and addition-inputting the delay signal to the driving step through a filter having a predetermined frequency characteristic in a specific frequency range.

In accordance with the sixth aspect of the present invention, in the fifth aspect, the specific frequency range includes frequencies where the gain, the transfer characteristic of the driving step, approximates to 1.

In accordance with the seventh aspect of the present invention, in the fifth aspect, the predetermined frequency characteristic is about equal to the inverse characteristic (1/G) of the transfer characteristic (G) of the driving step.

In accordance with the eighth aspect of the present invention, there is provided a positioning control method for positioning a moving member so that the moving member follows an objective member which periodically marks about the same position shift, comprising: a position detecting step for measuring the relative position error between the desired position of the objective member and the moving member; an adding step for adding a position error signal output from the position detecting step and a delay signal; a signal delaying step for outputting the delay signal which is obtained by delaying an output of the adding step at a period corresponding to the position shift of the objective member; a driving step for moving the moving member in the desired direction by a drive unit; an inputting step for inputting the signal of the sum of the position error signal and the delay signal to the driving step; and an energizing step for energizing the drive unit and/or the moving member so that the moving member makes a movement approximately equivalent to the amount of the position shift indicated by the delay signal in a specific frequency range.

Accordingly, the present invention enables a reduction of the position error that appears at a frequency higher than the vicinity of the cut-off frequency of the control loop, in which the prior art has its limitations. This helps to increase the storage density or track density of an optical disk unit and a magnetic disk unit which are required to ensure more accurate tracking. In addition, even when the rotational speed of a disk becomes high, the tracking performance can be improved without making a frequency band of the control loop higher.

That is, the output of the signal delay unit, which integrates/accumulates the relative position error of the target position that shifts periodically and the moving member, is simply added to the position error signal of each moment to feed the sum to the drive unit. Also the output of the signal delay unit is fed to the drive unit separately through a filter having a predetermined frequency characteristic or used as a signal for moving the moving member. Thereby, it is possible to reduce the position error which arises at a frequency higher than the vicinity of the cut-off frequency of the control loop. Thus, the tracking performance on a disk rotating at a high speed can be vastly improved, which helps to achieve the increase of the storage density or track density of an optical disk unit and a magnetic disk unit.

In the following, the principle of the present invention will be described using examples from the above-described first prior art. In the first prior art, the relative position error Xe is expressed as follows:

$$Xe = Xi - Xo$$

where Xi is target position shift, and Xo is the distance traveled by the moving member. Besides, the characteristic of the case where the output of the signal delay unit is added to the position error signal to thereby move the moving member is expressed as follows:

$$Xo = G(s)(Xe + XL)$$

where XL is the output of the signal delay unit, and G(s) is the transfer characteristic of the drive unit. As described previously for the first prior art, when the signal delay unit repeats the integrating operation for n periods, the nth relative position error is shown by the following expression 1 fairly well, and the output of the delay unit is approximated by the following expression 2.

$$Xe(n) = Xi/\{1+G(s)\}^n \qquad 1$$

$$XL(n) = Xi/G(s) \times \{1 - 1/(1+G(s))^{n-1}\} \qquad 2$$

The convergence condition of the position error is represented by the following expression 3. At a frequency where expression 3 is not satisfied, the error is expanded, resulting in a divergence in the control system. Incidentally, the gain of X will hereinafter be represented by |X|.

$$|1+G(s)| > 1 \qquad 3$$

In order to avoid that prospect, when applying the first prior art, a low-pass filter (transfer charateristic=Fi(s)) is generally set in the input part of the signal delay unit to ease the convergence condition of the position error as shown by the following expression 4.

$$|1+G(s)|>|Fi(s)| \qquad 4$$

Assuming that the delay unit output XL is fed to the drive unit separately through a filter having a specific characteristic F(s), the distance traveled by the moving member is expressed as follows:

$$Xo=G(s)(Xe+XL+F(s)XL)$$

Besides, the position error signal Xe(n) at the nth period with this drive is given by:

$$Xe(n)=Xi-G(s)(Xe(n)+XL(n)+F(s)XL(n))$$

If the above expression is rearranged using:

$$XL(n)=Xe(1)+Xe(2)+\ldots+Xe(n-1)$$

it can be written as:

$$Xe(n)-Xe(n-1)=-G(s)(1+F(s))Xe(n-1)/(1+G(s))$$

Hence, there is obtained the following recurrence formula:

$$Xe(n)=\{1-G(s)(1+F(s))/(1+G(s))\}Xe(n-1)=\{(1+G(s)-G(s)(1+F(s)))/(1+G(s))\}Xe(n-1)$$

Here, if it is assumed that Xe(1) is the position error that appears in the condition where the delay unit output is 0, the following expression for Xe(1) holds:

$$Xe(1)=Xi/(1+G(s))$$

Hence, the following expression 5 can be obtained.

$$Xe(n)=\{(1+G(s)-G(s)(1+F(s)))/(1+G(s))\}^{n-1}.Xe(1)=\{(1-G(s)F(s))/(1+G(s))\}^{n-1}.\{Xi/(1+G(s))\} \qquad 5$$

Compared expression 5 with expression 1 in the first prior art, although the denominators are the same $(1+G(s))^n$, the numerators are different: the numerator in expression 1 is 1, while that in expression 5 is $\{1-G(s) F(s)\}^{n-1}$.

Accordingly, by setting the proper filter characteristic F(s) so that G(s) F(s) approximates to 1, even when the value of 1+G(s) is smaller than 1, the value of numerator, 1−G(s) F(s), can be made smaller, and thereby the remaining position error Xe(n) can be brought close to 0. In other words, the convergence condition of the position error becomes as the following expression 6.

$$|1+G(s)|>|1-G(s)F(s)| \qquad 6$$

Since G(s) includes the transfer characteristic of the drive unit, the position control system generally includes a second order phase-delay characteristic. Therefore, to bring the value of G(s) F(s) close to 1 across the frequency domain where S→∞, a differential term must be included in F(s) (the order of the numerator in F(s)> the order of the denominator in F(s)). It in fact is difficult to realize the filter characteristic including a differential term. However, if such characteristic can be set in the vicinity of the cut-off frequency (frequency at which the gain of G(s) is 0 db) of the control loop where 1+G(s) is smaller than 1 or in a part of a frequency domain higher than it, the position error can be reduced to a practically adequate level.

That is, as with the prior art, a low-pass filter is set in the input part of the signal delay unit to ease the convergence condition of the position error as shown by the following expression 7.

$$|1+G(s)|>|1-G(s)F(s)|.|Fi(s)| \qquad 7$$

Unlike expression 4, F(s) is approximately equal to the inverse characteristic of G(s) in the vicinity of a frequency at which the gain of G(s) approximates to 1 or in a part of a frequency domain higher than it. Consequently, the cut-off frequency of Fi(s) in expression 7 can be set higher than the cut-off frequency of the control loop.

In addition, when G(s) includes only a first order phase-delay characteristic as with the speed control system, it is possible to set |1−G(s) F(s)|→1 (0 dB) with S→∞ (infinity) without the inclusion of a differential term in F(s), and therefore, in expression 7, it is theoretically possible to set Fi(s)=1 (equivalent to a value obtained when a low-pass filter is not set in the input part of the signal delay unit). However, to allow a margin for stability, it is desirable that Fi(s) has a low-pass characteristic.

Figure 1:
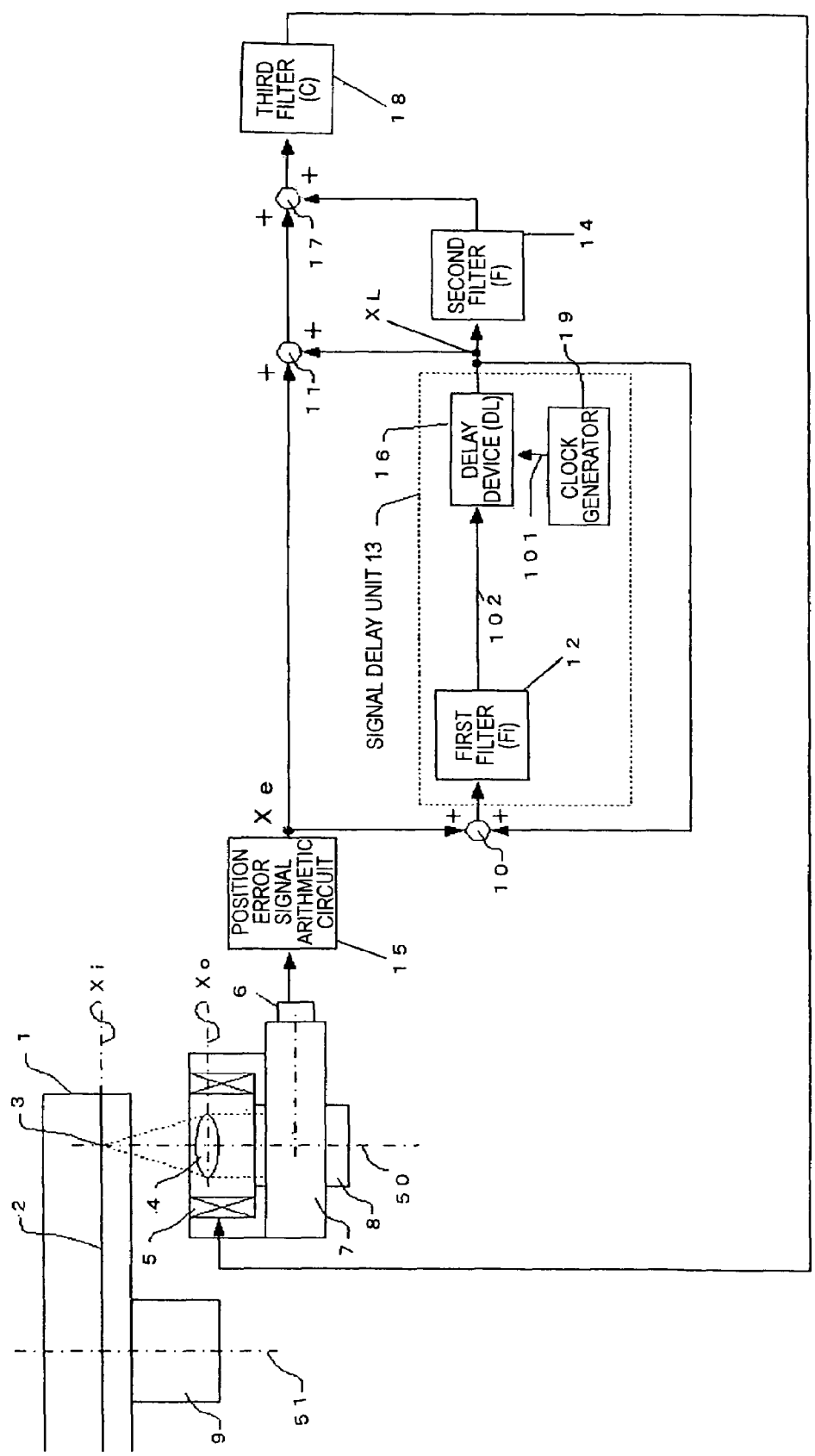
FIG. 1 is a block diagram showing an optical disk unit according to the first embodiment of the present invention.

Incidentally, the reference character 1 designates an optical disk. The reference character 2 designates an information recorded/recording position. The reference character 3 designates a light beam spot. The reference character 4 designates an objective lens. The reference character 5 designates a focus actuator. The reference character 6 designates an optical sensor. The reference character 7 designates an optical head. The reference character 8 designates a laser source. The reference character 9 designates a spindle motor. The reference character 10 designates a first adder circuit. The reference character 11 designates a second adder circuit. The reference character 12 designates a first filter. The reference character 13 designates a signal delay unit. The reference character 14 designates a second filter. The reference character 15 designates a position error signal arithmetic circuit. The reference character 16 designates a delay device. The reference character 17 designates a third adder circuit. The reference character 18 designates a third filter. The reference character 19 designates a clock generator. The reference character 20 designates a drive unit. The reference character 31 designates a fourth adder circuit. The reference character 50 designates an optical axis. The reference character 51 designates a spindle motor rotation axis. The reference character 101 designates a clock signal. The reference character 102 designates an input signal. The reference character Xe designates a position error signal. The reference character Xi designates a target position shift. The reference character XL designates a delay signal. The reference character Xo designates a distance traveled by a moving member.

BEST MODE FOR CARRYING OUT THE INVENTION

First Embodiment

FIG. 1 is a block diagram showing the configuration of a focusing (focal point control) system in an optical disk unit according to the first embodiment of the present invention.

Referring to FIG. 1, the laser source 8 emits a light beam, which reaches the objective lens 4 through the optical head 7 and is converged onto the optical disk 1. In this embodiment, the light beam spot 3 (a focal point of the light beam) serves as a moving member, and is displaced or shifted by Xo (Xo: a distance traveled by the moving member) by moving the objective lens 4 along the optical axis 50 by the focus actuator 5.

The spindle motor 9 rotates the optical disk 1 on substantially a fixed cycle under the control of its controller (not shown). The information recorded/recording position 2, which is an objective member in this embodiment, repeatedly marks about the same position shift Xi (Xi: target position shift) in the direction of the optical axis 50 on substantially a fixed cycle as the optical disk 1 rotates. Incidentally, in FIG. 1, the reference character 51 designates the rotation axis of the spindle motor 9.

Reflected light from the optical disk 1 reaches the optical sensor 6 through the objective lens 4 and the optical head 7 and is converted into an electronic signal. The optical sensor 6 outputs the electronic signal to the position error signal arithmetic circuit 15. The position error signal arithmetic circuit 15 extracts a focus error signal from the output signal of the optical sensor 6 to output it. Generally, the focus error signal is detected by the knife edge method, the astigmatism method, or the like.

The position detecting unit of the first embodiment comprises the laser source 8, the optical head 7, the optical sensor 6 and the position error signal arithmetic circuit 15, which are involved in the detection of the focus error signal. Incidentally, the focus error signal output from the position error signal arithmetic circuit 15 is the position error signal Xe.

In the focusing device in the optical disk unit according to the first embodiment, there is formed a positioning control system for maintaining the light beam spot 3 in the information recorded/recording position 2 on the optical disk 1.

Referring to FIG. 1, the first adder circuit 10 adds the position error signal Xe and the delay signal XL output from the signal delay unit 13, and outputs the sum to the first filter 12. The first filter 12 performs a band limit function for the output of the first adder circuit 10, and outputs the band-limited signal to the delay device 16. The delay device 16 delays the output of the first filter 12 by the period L about equal to the period of one rotation of the disk, thereby outputting the delay signal XL.

Provided only that prescribed delay signals are obtained, any means can be used as the delay device 16. However, in the case of, for example, forming a positioning control device as an analog controller as in this embodiment, CCD (Charge Coupled Device) is conveniently used for the delay device 16. CCD, which is a kind of shift register for analog signals, shifts the input signal 102 of the delay device 16 to the output side according to the clock signal 101 output from the clock generator 19, thus providing a delay signal corresponding to the clock signal 101. Besides, in the case of forming a positioning control device as a digital controller, signal data output from the first filter 12 is input to a shift register that operates based on the clock signal 101 to delay signals in a simple way.

The signal delay unit 13 of the present invention mainly includes the delay device 16, the first filter 12 and the clock generator 19.

The delay signal XL corresponds to the sum of the position error signals generated by the past rotations of the optical disk 1 within the frequency limit of the first filter 12. Consequently, as long as the position error remains within the frequency limit of the first filter 12, the value of the delay signal XL keeps on increasing at every rotation of the optical disk 1. The integrating/accumulating operation is continued until the value of the position error signal becomes 0 (zero) within the frequency limit of the first filter 12.

The second adder circuit 11 adds the position error signal Xe and the delay signal XL to output the sum. The second filter 14 carries out a prescribed filtering for the delay signal XL, and outputs it. The characteristic of the second filter 14 can be realized without differential operation by connecting a filter having the characteristic inverse to that of the drive unit 20 (see FIG. 2) to be described later, in series with a low-pass filter, whose order is equal to the relative order of the pole and zero of the characteristic of the drive unit 20 and whose cut-off frequencies are broader than those of the focus control loop.

The third adder circuit 17 adds the output of the second adder circuit 11 and the output of the second filter 14 to output the sum. The third filter 18 inputs the output of the third adder circuit 17. The input of the third filter 18 undergoes gain adjustment, phase compensation and power amplification, and is output from the third filter 18. Having received the output of the third filter 18, the focus actuator 5 moves the objective lens 4 along the optical axis 50.

The drive unit 20 of the first embodiment comprises the focus actuator 5, which is involved in the movement of the light beam spot 3, and the third filter 18.

Figure 2:
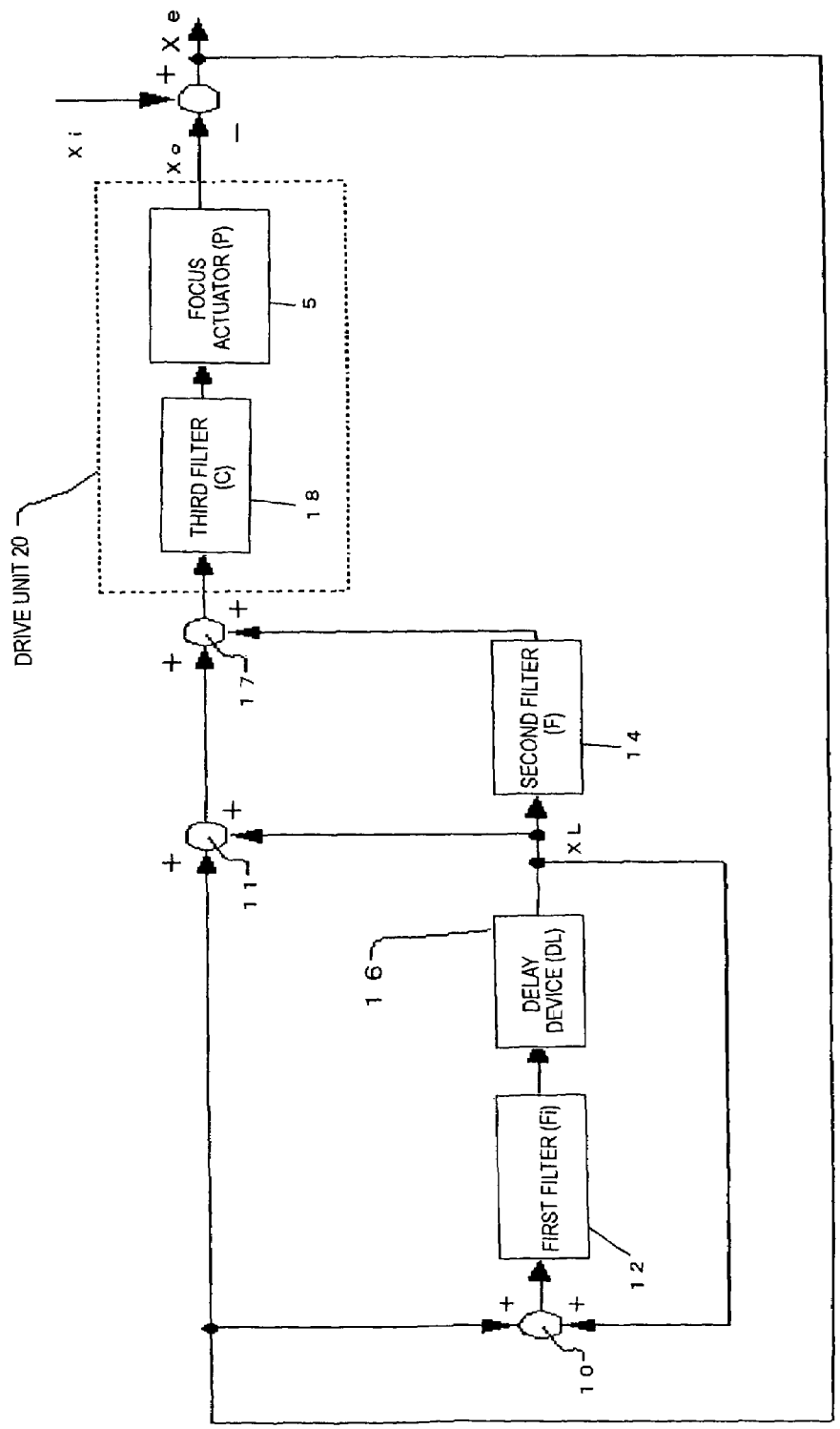
FIG. 2 is a block diagram showing a positioning control device in the optical disk unit depicted in FIG. 1.

In the following, a description will be given of operations according to the first embodiment of the present invention. FIG. 2 is a block diagram showing the focusing (focal point control) system of the optical disk unit depicted in FIG. 1. Incidentally, for the simplicity of the explanations given hereinafter, it will be assumed that the value of the gain characteristic of the system involved in operations from the displacement of the moving member by Xo to the generation of the position error signal Xe is 1.

The following expression 8 including the phase-delay of the second order gives an approximation to the transfer characteristic P of the focus actuator 5 of this embodiment.

$$P(s)=348/(s^2+21.9s+1.14\times10^5) \text{(unit: m/A)} \qquad 8$$

Figure 3:
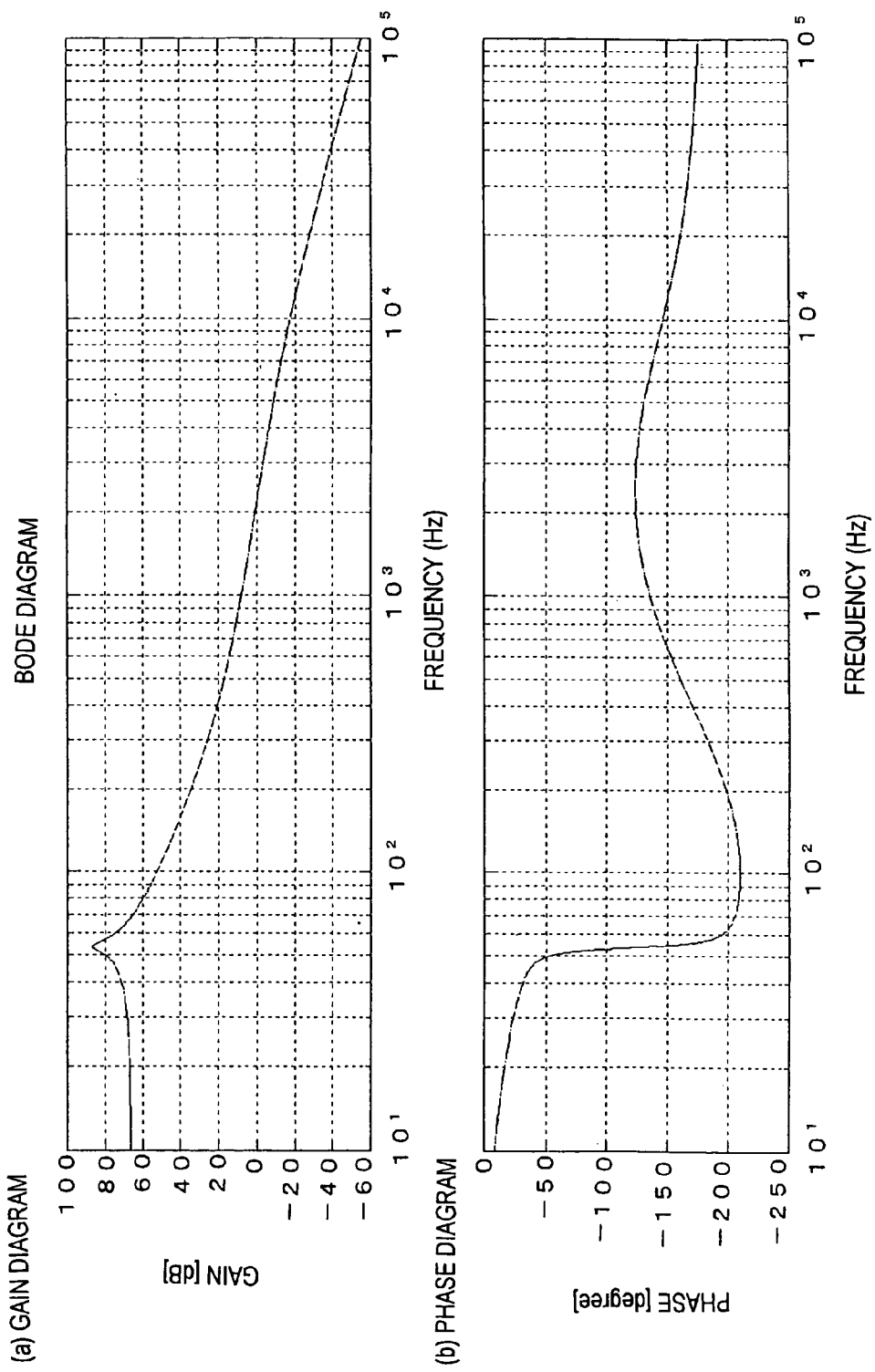
FIG. 3 is a couple of diagrams of the frequency characteristic for explaining the operation of the positioning control device depicted in FIG. 1.

When the transfer characteristic C(s) of the third filter 18 is defined as the following expression 9, the transfer characteristic G(s) of the drive unit 20 is expressed by the following expression 10, and illustrated by the gain diagram and phase diagram in FIGS. 3(*a*) and (*b*).

$$C(s)=2\times10^6\times\{(s+1741)/(s+326)\}\times\{(s+3141)/(s+50265)\}\quad\quad 9$$

$$G(s)=C(s)P(s)\quad\quad 10$$

Referring to FIGS. 3(a) and (b), the phase is delayed by roughly 180 degrees in the vicinity of a frequency (the cut-off frequency of the focus control loop: 2 kHz) at which the gain is 1 (0 db). Consequently, at a frequency higher than 2 kHz, no error reducing effect can be expected from the drive unit 20 of this embodiment.

When the transfer characteristic F(s) of the second filter 14 is defined as the following expression 11, the transfer characteristic F(s) is about equal to the characteristic inverse to that of the drive unit 20 in the vicinity of the cut-off frequency of the focus control loop or in a part of a frequency domain higher than it. In expression 11, the inverse characteristic $P(s)^{-1}$ of the focus actuator 5 included in $G(s)^{-1}$ can be obtained by using the approximate characteristic of the focus actuator 5 experimentally obtained in advance.

$$F(s)=G(s)^{-1}\times\{3.14\times10^5/(s+3.14\times10^5)\}^2\quad\quad 11$$

Besides, the following expression 12 is obtained when the frequency limit in the transfer characteristic of the first filter 12 is set at 6 kHz, which is higher than the cut-off frequency of the control loop: 2 kHz.

$$Fi(s)=3.77\times10^4/(s+3.77\times10^4)\quad\quad 12$$

Figure 4:
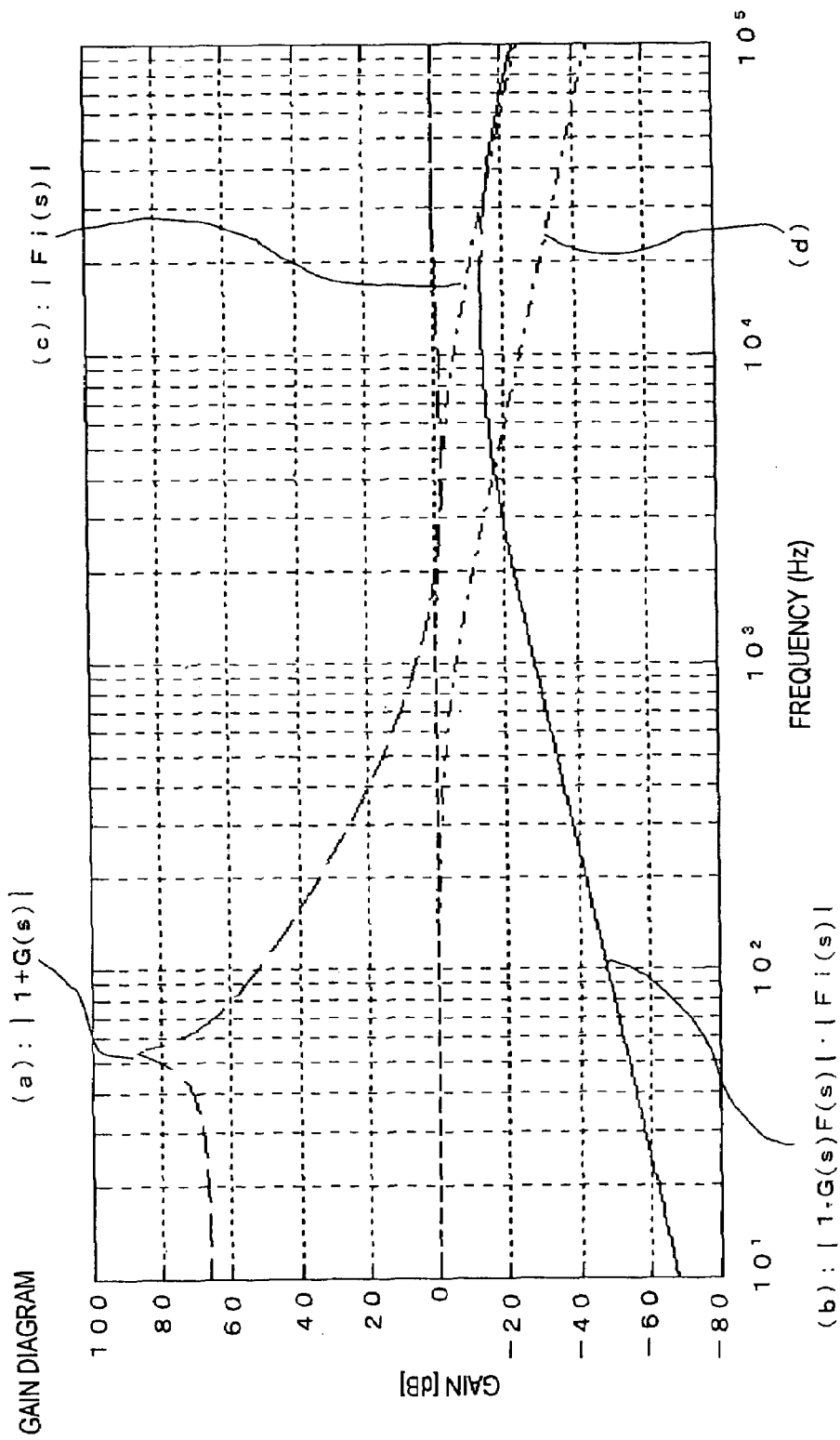
FIG. 4 is a diagram of the frequency characteristic for explaining the operation of the positioning control device depicted in FIG. 1.

FIG. 4 is a diagram illustrating the convergence condition of the position error shown by expression 7 when each characteristic is set as the above expressions 8 to 12. As can be seen from (a) and (b) in FIG. 4, the convergence condition of the position error shown by expression 7 is satisfied in the first embodiment of the present invention. However, according to the aforementioned prior art in which the second filter 14 is not used (F(s)=0), |1+G(s)| indicated by (a) falls below 0 dB around the cut-off frequency of the control loop: 2 kHz, and therefore |Fi(s)| indicated by (c) does not satisfy the convergence condition of the position error shown by expression 4. Consequently, the cut-off frequency of the first filter 12 have to be set lower than that of the control loop, for example, as indicated by (d).

On the other hand, according to the first embodiment of the present invention, the frequency limit of the transfer characteristic Fi(s) can be set higher than the cut-off frequency of the control loop.

The following expression 13 represents the transfer characteristic DL(s) of the delay device 16.

$$DL(s)=e^{-Ls}\quad\quad 13$$

At this point, let Gc(s) denote the position error reducing characteristic of the focus control system shown in FIG. 2 (the transfer characteristic of the system involved in operations from the target position shift Xi to the generation of the position error signal Xe), then the transfer characteristic Gc(s) is expressed by the following expression 14.

$$Gc(s)=\{1-Fi(s)e^{-Ls}\}/\{1-Fi(s)e^{-Ls}+G(s)+G(s)F(s)Fi(s)e^{-Ls}\}\quad\quad 14$$

Besides, let Gcs(s) be the characteristic of reducing the position error components which include higher harmonics and synchronize with the rotation of the optical disk 1, then the reducing characteristic Gcs(s) is represented as the following expression 15 by substituting $e^{-Ls}=1$ into expression 14.

$$Gcs(s)=\{1-Fi(s)\}/\{1-Fi(s)+G(s)+G(s)F(s)Fi(s)\}\quad\quad 15$$

Figure 5:
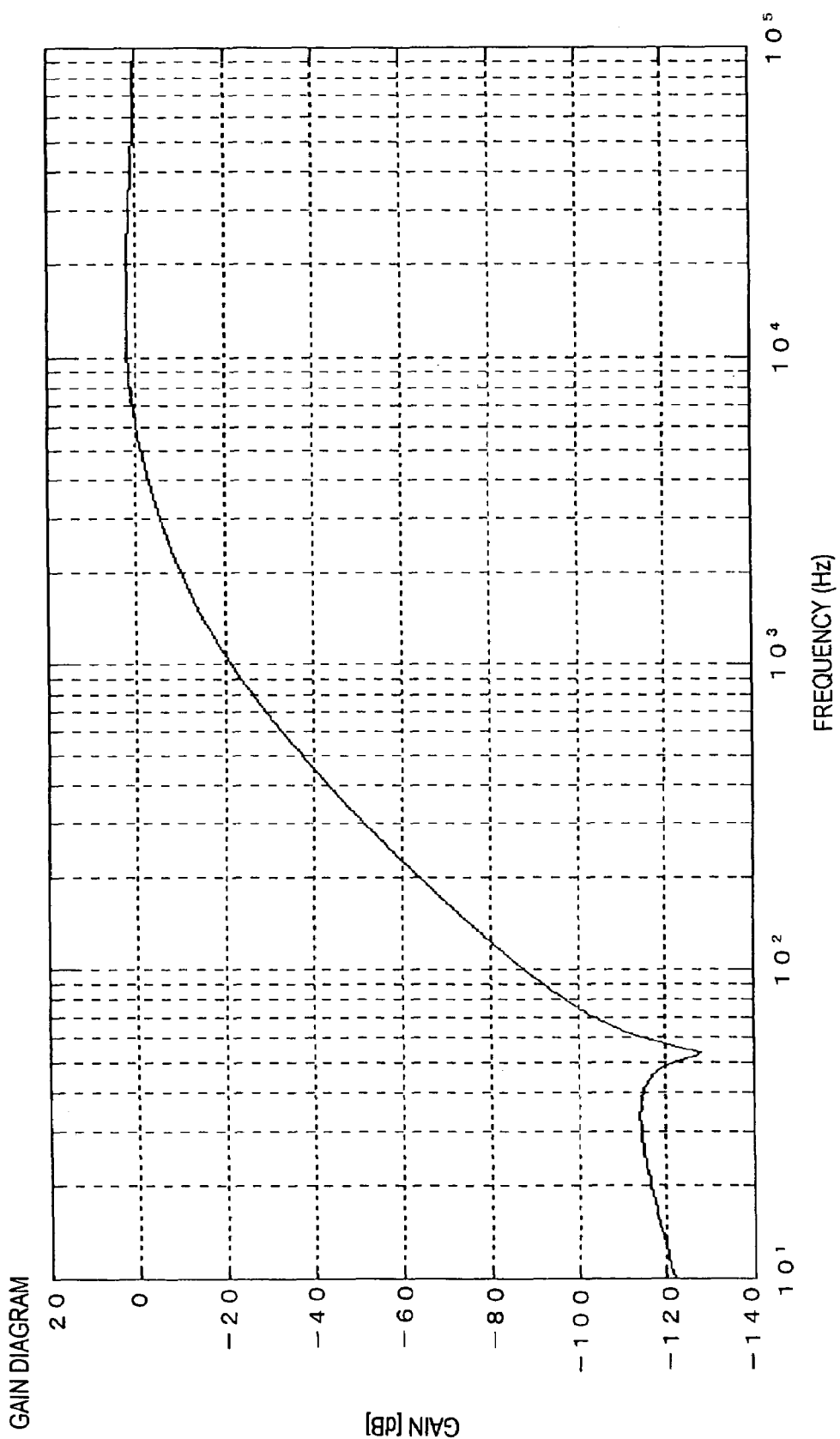
FIG. 5 is a diagram of the frequency characteristic for explaining the operation of the positioning control device depicted in FIG. 1.

FIG. 5 is a diagram showing the gain of the reducing characteristic Gcs(s) according to the first embodiment of the present invention. Referring to FIG. 5, an error reducing effect of more than 10 dB can be achieved on the position error components synchronized with the rotation of the optical disk 1 in the vicinity of the cut-off frequency of the control loop (2 kHz), where the reducing effect has hardly been obtained by the prior art.

Second Embodiment

In the following, a description will be made in detail of the second embodiment of the present invention with reference to the drawings. While the inverse characteristic $P(s)^{-1}$ of the focus actuator 5 is included in the transfer characteristic F(s) in expression 11 of the first embodiment, the transfer characteristic F(s) can be simply expressed as the following expression 16 from the perspective that the primary resonance frequency of the focus actuator 5 is sufficiently low, about 50 Hz, as compared to the cut-off frequency of the control loop, 2 kHz, and can be approximated to the second order integral characteristic in the vicinity of the cut-off frequency of the control loop.

$$F(s)=C(s)^{-1}\times\{s^2/348\}\{3.14\times10^5/(s+3.14\times10^5)\}^2\quad\quad 16$$

Figure 6:
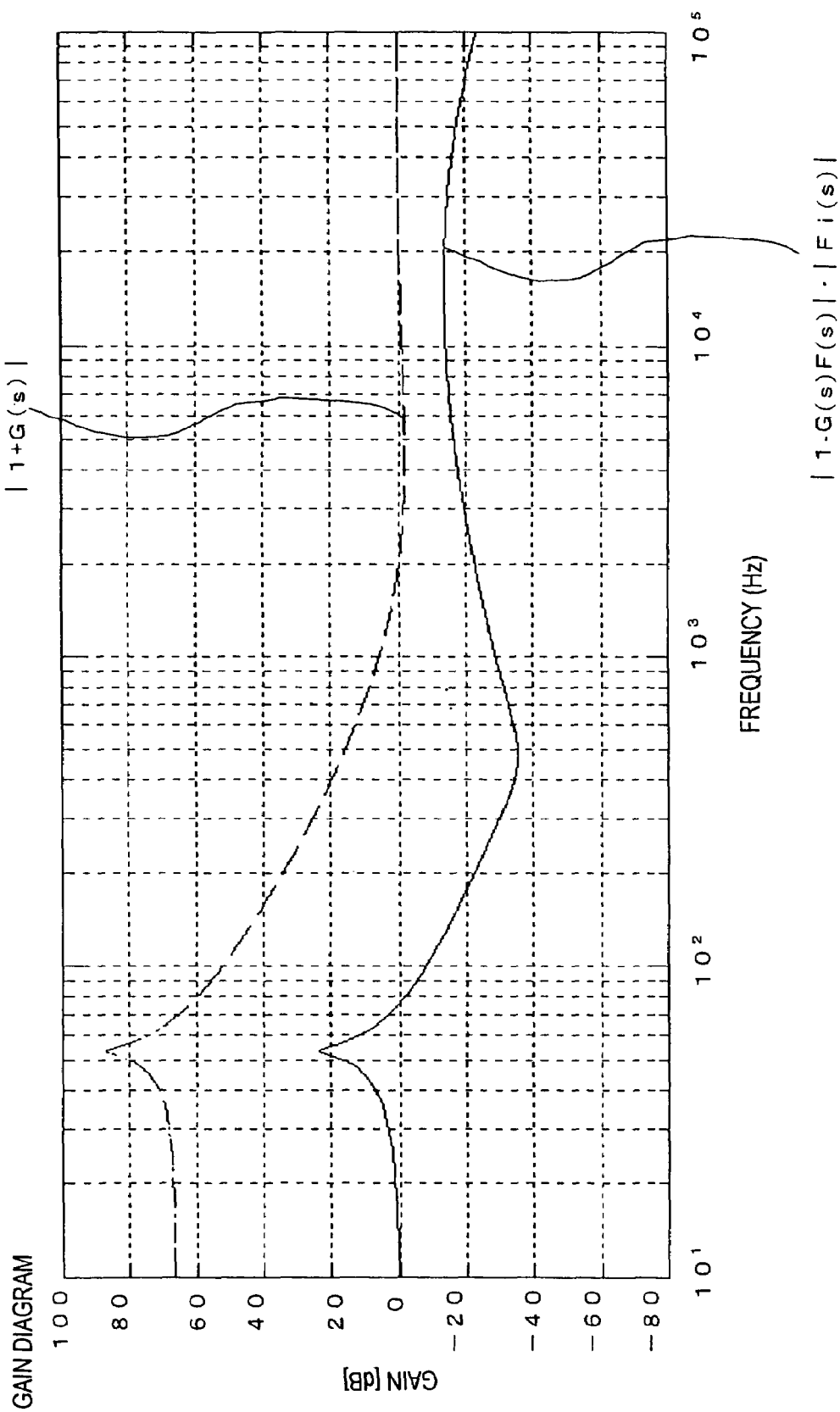
FIG. 6 is a diagram of the frequency characteristic for explaining the operation of the positioning control device depicted in FIG. 1.
Figure 7:
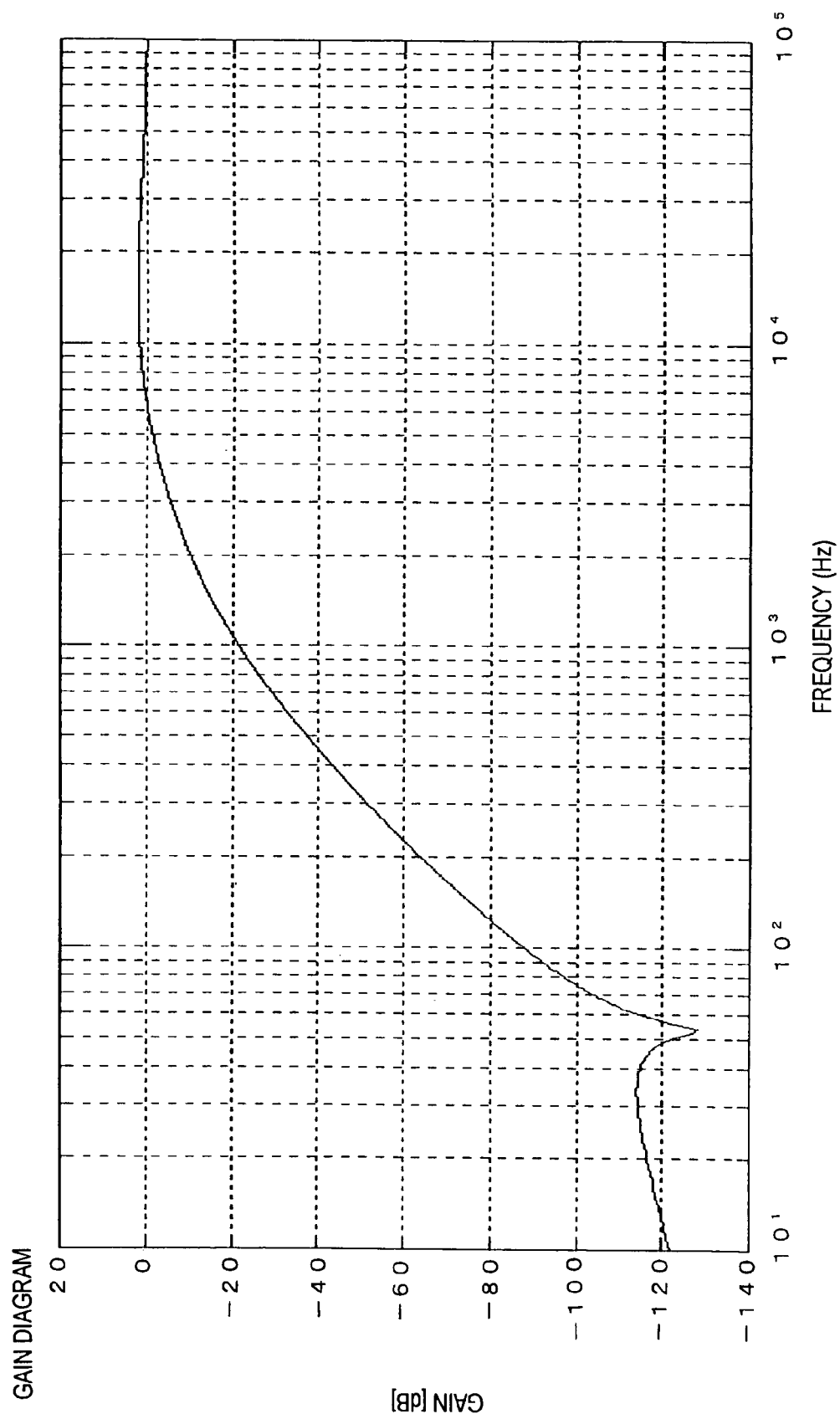
FIG. 7 is a diagram of the frequency characteristic for explaining the operation of the positioning control device depicted in FIG. 1.

FIGS. 6 and 7 are diagrams illustrating respectively the convergence condition of the position error shown by expression 7 and the characteristic of reducing the position error components synchronized with the rotation of the optical disk 1: Gcs(s) when expression 11 is replaced by expression 16 in the first embodiment. As can be seen in FIGS. 6 and 7, according to the second embodiment of the present invention, it is possible to achieve the same effect as in the first embodiment.

Third Embodiment

Figure 8:
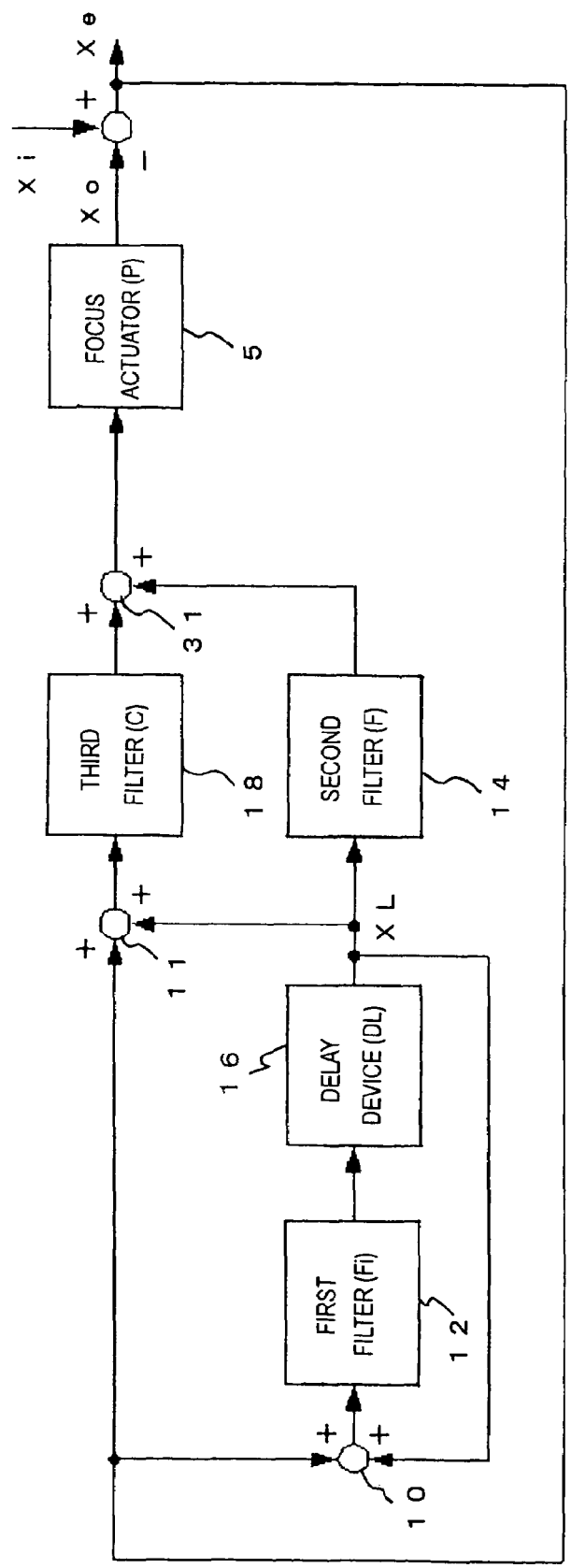
FIG. 8 is a block diagram showing a positioning control device according to the third embodiment of the present invention.

In the following, a description will be made in detail of the third embodiment of the present invention with reference to the drawings. FIG. 8 is a block diagram showing a positioning control device according to the third embodiment of the present invention.

In FIG. 2, which is a block diagram showing the positioning control device of the first embodiment, the output of the second filter 14 is added to the input of the third filter 18 using the third adder circuit 17.

On the other hand, the third embodiment is characterized in that expression 11 is replaced by the following expression 17, and the output of the second filter 14 is added to the output of the third filter 18 using the fourth adder circuit 31 to directly energize the focus actuator 5 as shown in FIG. 8. In this manner, the equivalent system shown in FIG. 8 (corresponding to the system of FIG. 2 in the first embodiment) can obviously provide the same position error reducing effect.

$$F(s)=P(s)^{-1}\times\{3.14\times10^5/(s+3.14\times10^5)\}^2\quad\quad 17$$

Incidentally, the respective embodiments have been described by taking a controller structure in the analog control system as an example although the same effect can be obtained in the digital control system. In addition, for purposes of description the respective embodiments have been described as applied to a focusing (focal point control) system in an optical disk unit. However, the present invention can be applied to other systems having similar properties and is not limited to the above example.

Further, it is apparent that the present invention is not to be restricted by the embodiments, and changes and modifications may be made therein without departing from the spirit of the invention. Still further, in the above embodiments, the number, position, shape, etc. of components are cited merely by way of example and without limitation. Additionally, like reference characters refer to like components throughout the drawings.

INDUSTRIAL APPLICABILITY

As set forth hereinabove, in accordance with the present invention, it is possible to reduce the relative position error in tracking or track-following by using the periodicity of position shift without unnecessarily increasing the gain and frequency band being the transfer characteristics of the control system. Thus, the position error that appears at a frequency higher than the vicinity of the cut-off frequency of the control loop can be reduced.

Accordingly, it is made possible to increase the storage density or track density of an optical disk unit and a magnetic disk unit which are required to ensure more accurate tracking. Moreover, even when the rotational speed of a disk becomes high, the tracking performance can be improved without providing the control loop with a higher frequency band.

The invention claimed is:

1. A positioning control device which positions a moving member so that the moving member follows an objective member which almost equally repeats a position shift with substantially constant period, the device comprising:
   a position detecting unit which measures a relative position error between a desired position of the objective member and the moving member;
   a first adding unit which adds a position error signal output from the position detecting unit and a delay signal;
   a signal delay unit which outputs the delay signal which is obtained by delaying an output of the first adding unit at a time corresponding to said substantially constant period;
   a filter having a predetermined frequency characteristic in a specific frequency range, wherein the filter outputs a filtered delay signal;
   a second adding unit which adds the position error signal, the delay signal and the filtered delay signal; and
   a drive unit which moves the moving member based on a signal output from the second adding unit.

2. The positioning control device claimed in claim 1, wherein the frequency range includes frequencies where a transfer characteristic of the drive unit approximates to 1.

3. The positioning control device claimed in claim 1, wherein the predetermined frequency characteristic is about equal to an inverse characteristic of a transfer characteristic of the drive unit.

4. A positioning control device which positions a moving member so that the moving member follows an objective member which almost equally repeats a position shift with substantially constant period, the device comprising:
   a position detecting unit which measures a relative position error between a desired position of the objective member and the moving member;
   an adding unit which adds a position error signal output from the position detecting unit and a delay signal;
   a signal delay unit which outputs a delay signal which is obtained by delaying an output of the adding unit at a time corresponding to said substantially constant period;
   a filter which outputs a filtered delay signal, having characteristics, by which the moving member makes a movement approximately equivalent to the position shift indicated by the delay signal, in a specific frequency range;
   a drive unit which moves the moving member in a desired direction by using the filtered delay signal and the output of the adding unit.

5. A positioning control method for positioning a moving member so that the moving member follows an objective member which almost equally repeats a position shift with substantially constant period, the method comprising:
   a position detecting step for measuring a relative position error between a desired position of the objective member and the moving member;
   a first adding step for adding a position error signal output from the position detecting step and a delay signal;
   a signal delaying step for outputting the delay signal which is obtained by delaying an output of the first adding step at a time corresponding to said substantially constant period;
   a filtering step for filtering the delay signal by a filter having a predetermined frequency characteristic in a specific frequency range;
   a second adding step for adding the position error signal, the delay signal and the filtered delay signal; and
   a driving step for moving the moving member based on a signal output from the second adding step.

6. The positioning control method claimed in claim 5, wherein the specific frequency range includes frequencies where the gain, the transfer characteristic of the driving step, approximates to 1.

7. The positioning control method claimed in claim 5, wherein the predetermined frequency characteristic is about equal to the inverse characteristic (1/G) of the transfer characteristic (G) of the driving step.

8. A positioning control method for positioning a moving member so that the moving member follows an objective member which almost equally repeats a position shift with substantially constant period, the method comprising:
   a position detecting step for measuring a relative position error between a desired position of the objective member and the moving member;
   an adding step for adding a position error signal output from the position detecting step and a delay signal;
   a signal delaying step for outputting the delay signal which is obtained by delaying an output of the adding step at a time corresponding to said substantially constant period;
   a filtering step for filtering the delay signal by a filter having characteristics, by which the moving member makes a movement approximately equivalent to the position shift indicated by the delay signal, in a specific frequency range;
   a driving step for moving the moving member in a desired direction by using an output of the filtering step and the output of the adding step.

9. The positioning control device claimed in claim 1, wherein a transfer characteristic F(s) of the filter having a predetermined frequency characteristic satisfies a relationship $|1-G(s)F(s)|<|1+G(s)|$, where G(s) is a transfer characteristic of the drive unit.

10. The positioning control method claimed in claim 5, wherein a transfer characteristic F(s) of the filter having a predetermined frequency characteristic satisfies a relationship in $|1-G(s)F(s)|<|1+G(s)|$, where G(s) is a transfer characteristic of the drive unit.

* * * * *